United States Patent

[11] 3,588,655

| [72] | Inventor | William E. Egan |
| | | Pittsfield, Mass. |
| [21] | Appl. No. | 827,755 |
| [22] | Filed | May 26, 1969 |
| [45] | Patented | June 28, 1971 |
| [73] | Assignee | General Electric Company |

[54] MOTOR CONTROL SYSTEM WITH UNIJUNCTION TRIGGERING CIRCUIT TO COMPENSATE FOR THE NONLINEARITY OF AN SCR AMPLIFIER
6 Claims, 3 Drawing Figs.

| [52] | U.S. Cl. | 318/345 |
| [51] | Int. Cl. | H02p 5/16 |
| [50] | Field of Search | 318/331, 345; 307/301 |

[56] References Cited
UNITED STATES PATENTS

| 3,193,696 | 7/1965 | Waldron | 307/301 |
| 3,226,627 | 12/1965 | Fromkin | 307/301 |
| 3,431,479 | 3/1969 | Joslyn | 318/345 |

*Primary Examiner*—Oris L. Rader
*Assistant Examiner*—Thomas Langer
*Attorneys*—John F. McDevitt, Frank L. Neuhauser, Joseph B. Forman and Oscar B. Waddell ABSTRACT: A motor control system utilizing a phase control power amplifier with controlled rectifiers which includes unijunction transistor triggering circuit means to vary the magnitude of actuating signals to said power amplifier and compensate for gain variation occurring in the rectification system. In order to linearize the relationship between current in the controlled motor and input control signal applied to the motor control system over the range of operation, a nonlinear relationship is provided in the triggering circuit means between variation of the triggering pulse with input control signal to compensate for a nonlinear response between variation of current with firing angle in the control rectifier stage of the power amplifier. A nonlinear gain is accomplished in the triggering circuit by impressing a voltage at the emitter electrode of a unijunction transistor element from a capacitor assembly being charged by a constant current source so as to provide discrete slope changes in the relationship between voltage across the capacitor elements as a function of the charging time. By utilization of a phasing voltage in said circuit, the triggering pulses are synchronized for operation with the AC power source to the controlled motor. In a preferred embodiment, the triggering circuit also includes means to vary the charging of the capacitor assembly as a function of the magnitude of the back EMF in the controlled motor thereby providing improved linearity of response for speed changes in said motor.

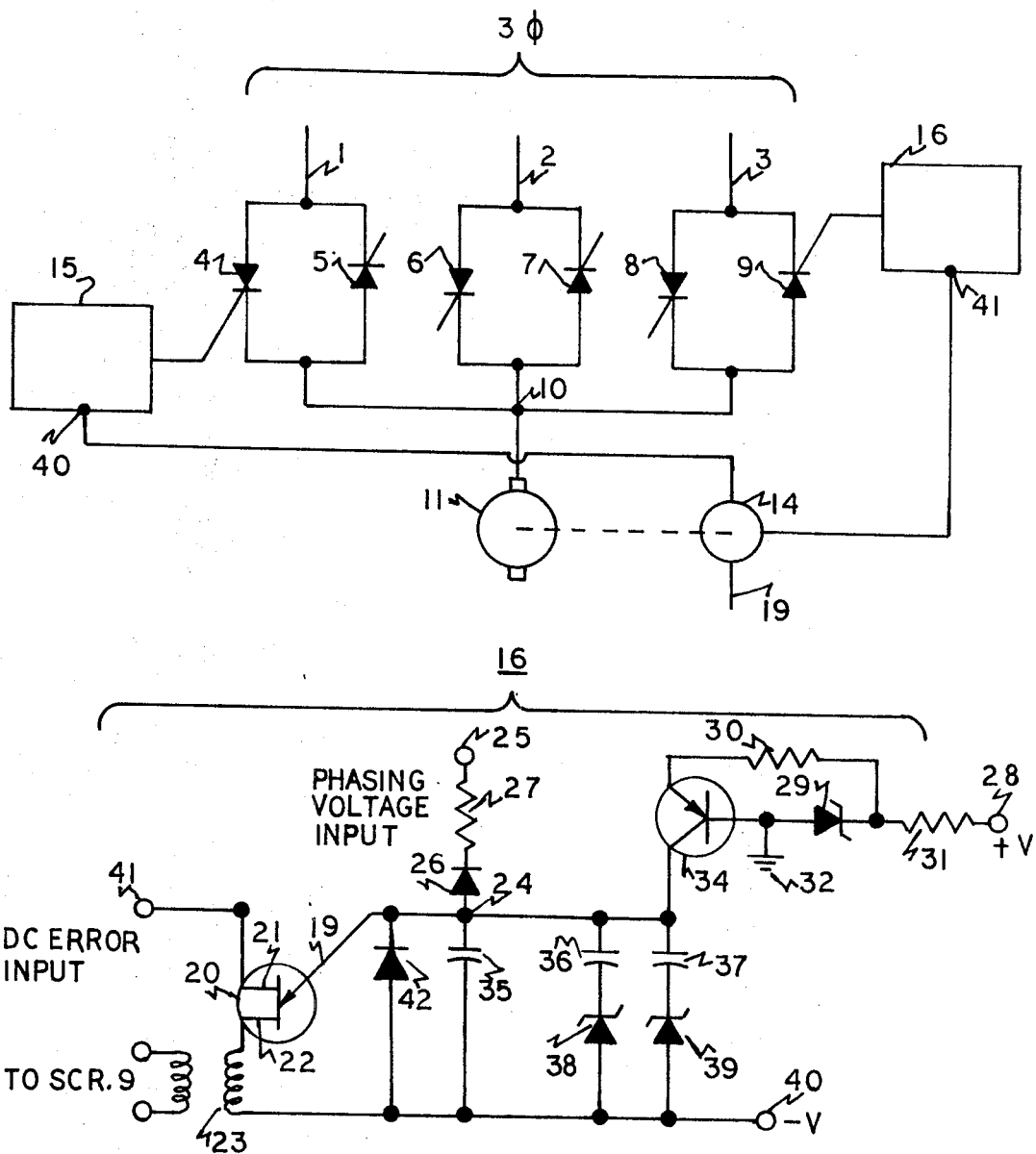

MOTOR CONTROL SYSTEM WITH UNIJUNCTION TRIGGERING CIRCUIT TO COMPENSATE FOR THE NONLINEARITY OF AN SCR AMPLIFIER

BACKGROUND OF THE INVENTION

A common application for controlled rectification systems is to supply a DC motor with a rectified AC line voltage, the average value of which is desired to be variable depending upon an input control signal. The average value of the rectified voltage is dependent upon the length of time during an AC half cycle that the rectifier is conducting. Typical rectifier elements for said control rectification systems include an ignatron or thyratron, as exemplary of gas-filled type devices or the newer solid state device such as a silicon controlled rectifier (SCR). If the rectifier is chosen such that its conducting cycle is initiated by a triggering pulse supplied to the control electrode of the rectifier, then the average value of the voltage supplied by the rectifier is a function of the time during the AC cycle in which a triggering pulse is supplied to the control electrode of the rectifier. A triggering circuit for a controlled rectification system is therefore a circuit which supplies firing pulses to the rectifiers at some phase angle, which phase angle is determined by an input control signal.

When a silicon controlled rectifier is used as a rectifier in a controlled rectification system such as a phase control power amplifier driving a DC motor load, a very common firing circuit comprises a unijunction transistor with a pulse output transformer coupled to the transistor output circuit and the gate-cathode circuit of the silicon controlled rectifier. It has been the normal practice to supply the input base electrodes of the unijunction transistor with a phasing voltage which is dependent upon the phase angle of the AC voltage and to supply the input emitter electrode of the unijunction transistor with a DC error signal developed at the load. Thus, in accordance with unijunction transistor practice, when the DC error voltage at the emitter electrode raises to a certain predetermined fraction of the phasing voltage present at the input base electrodes, the transistor will fire and dump a triggering pulse into the pulse output transformer. It has been found that when the unijunction transistor is operated in this manner, a nonlinear relationship exists between the DC error signal and the phase angle in which the unijunction transistor fires. In order to supply variable power to the DC motor throughout a wide range, the phase angle at which the SCR fires must also be variable throughout a wide range. While it would be desirable to have the same circuit gain throughout this wide range and overcome the above nonlinearity, it has been found that a different nonlinearity in the gain of a phase controlled power amplifier in the rectification system must also be overcome for accurate control in servomechanism applications.

It is therefore an important object of this invention to provide a unijunction transistor triggering circuit having a response which compensates for nonlinear response of the phase control amplifier in the rectification system.

Another important object of this invention is to provide triggering circuits for a controlled rectification system having operational advantages for servomechanism applications.

Another important object of this invention is to provide a motor control system wherein the various nonlinearities of control rectification are all minimized through modification of the triggering circuit means.

Briefly, these and other objects are achieved with a unijunction transistor triggering circuit in which the unijunction transistor is operated in the inverted mode, that is, the input DC control signal is applied to an input base electrode rather than to the emitter electrode and a voltage is applied to the emitter electrode which is derived across an assembly of parallel connected capacitor elements being coupled together for charging from a source of constant current in a manner which compensates for the nonlinear response in the power amplifier. In a preferred embodiment, the individual capacitor elements are electrically separated by isolating diodes and the capacitor element next adjacent the constant current source is charged to a voltage sufficient to forward bias a diode separating the next adjacent capacitor element whereupon both capacitor elements become effectively coupled together to parallel. That is, the constant current source now charges a parallel combination of capacitors in a mode of operation which achieves a number of finite linear charging slope changes and provides a response needed for compensation of the nonlinear response in the power amplifier. The desired cooperation between parallel connected capacitor elements can be achieved with series connected voltage elements coupled between said capacitor elements, such as Zener diodes, which block the flow of current to the associated capacitor elements until a threshold level has been reached. If the ordinary diodes are used as the separating voltage elements, it becomes necessary to add a voltage source across the capacitor assembly of the triggering circuit to achieve the desired isolation of associated capacitor elements for discrete slope changes in the charging of the assembly.

The subject matter regarded as my invention is particularly pointed out and distinctly claimed in the appended claims. The invention, however, both as to its mode of operation, together with further objects and advantages thereof, may best be understood with reference to the following description taken in connection with the accompanying drawings.

DESCRIPTION OF DRAWINGS

FIG. 1 is a block diagram of a motor control system made in accordance with the principles of this invention;

FIG. 2 is a detailed circuit diagram of a unijunction transistor triggering circuit means used in motor control system of the present invention;

Referring to FIG. 1, three phase power, comprising phase 1, 2 and 3, is shown supplied to a solid state power amplifier comprising six silicon controlled rectifiers (SCRs) over conductors 1, 2 and 3 respectively. The particular phase at each respective conductor supplies power to a pair of SCRs connected reversibly in parallel. The six SCRs in the power amplifier represented by numerals 4—9 respectively, and their polarities are such that SCRs 4, 6 and 8 supply positive current and SCRs 5, 7 and 9 supply negative current. Each of the SCRs comprises an anode, a cathode, and a gate electrode and is characterized in that it exhibits a high and low impedance state. Typically an SCR is triggered into its low impedance state when a positive anode voltage with respect to the cathode voltage is present and a triggering pulse is supplied to the gate electrode. After the SCR has been triggered into conduction the control over it by the gate electrode ceases and it will continue to conduct as long as there is a positive anode voltage present.

Figure 3:
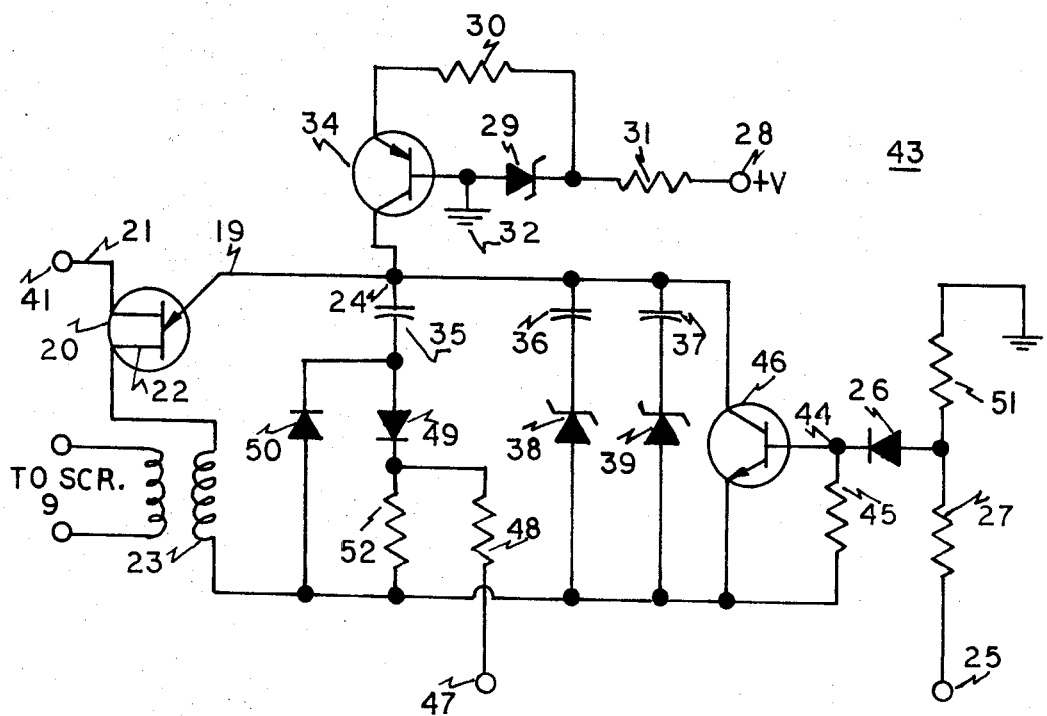
FIG. 3 is a detailed circuit diagram of a different unijunction transistor triggering circuit means of the present invention.

The output of each respective pair of SCRs in the power amplifier is connected to a common junction point 10, which point is connected to the armature circuit of a reversible DC motor 11. The motor 11 operates to drive any suitable load which is not shown for the sake of clarity and simplicity. The control of the speed and direction of the motor, and therefore the load, is obtained by varying the magnitude and the direction of the voltage supplied by the SCRs in the power amplifier to the motor. The motor is caused to drive the load in the positive direction when the SCRs 4, 6 and 8 conduct and in the negative direction when the SCRs 5, 7 and 9 conduct. The servo amplifier 14 is shown mechanically coupled to the shaft and of motor 11 and electrically connected to triggering circuits 15 and 16 for SCRs 4 and 9, respectively. Depending upon the actual mechanical position of the shaft of motor 11 and therefore the position of the load, the servo amplifier 14 develops another signal indicative of the difference between the actual and the desired position of the load at terminal 19. The error signal is delivered to the triggering circuits 15 and 16 at terminals 40 and 41 respectively to control time of conduction for the SCRs 4 and 9. An error signal of proper polarity and magnitude presented by the servo amplifier 14 to the triggering circuit 15 causes the SCR 4 to conduct at a desired phase angle in the positive half cycle of the AC voltage delivered over conductor 1. Since the average value of voltage delivered through the SCR to the motor 11 is a function of the phase angle at which the SCR is rendered conductive, the triggering circuit error signal developed by the servo amplifier 14 effects a control over the magnitude of the voltage delivered to the motor 11. In a similar manner the servo amplifier 14 can be made to control the magnitude of negative voltages delivered to the motor 11 by sending an error signal to the triggering circuit 16 to trigger the SCR 9 at a desired phase angle of the negative half cycle of the phase present at conductor 3. It should be understood the similar connections from the servo error amplifier 14 to the triggering circuits for the SCRs 5, 6, 7 and 8 are also necessary; but since they are identical to the connections shown for the SCRs 4 and 9, they are omitted from FIG. 1 for the sake of clarity and simplicity of explanation.

Referring now to FIG. 2 there is shown a silicon control rectifier triggering circuit 16 in accordance with a preferred embodiment of this invention. Said triggering circuit is shown to comprises a unijunction transistor 20 shown with its base one electrode 21 adapted to be connected to terminal 41 to receive the error signal developed by the servo amplifier 14 and its base two electrode 22 connected to the primary winding of a pulse output transformer 23, the secondary of which is adapted to be connected to the gate-cathode circuit for the SCR 9. A halfway rectified voltage is adapted to be presented to a junction point 24 from an AC source connected terminal 25 after passage through diode 26 and resistor 27 which develop the proper polarity and magnitude signal. A source of positive voltage is applied at terminal 28 which is coupled to a combination of Zener diode 29, resistor 30 and resistor 31 to provide a constant flow in the emitter-collector path of a transistor 34 having ground connection 32. The constant current flowing through the transistor 34 initially charges a capacitor element 35 which is in a parallel capacitor array coupled between the collector electrode of transistor 34 and negative voltage terminal 40. Electrical connection means are provided to impress the voltage across said capacitor assembly to the emitter electrode of the unijunction transistor 20. Said capacitor assembly further includes capacitor elements 36 and 37 having voltage elements in the form of Zener diodes 38 and 39 serially connected therebetween with all elements in the capacitor assembly being coupled to negative voltage terminal 40. An isolating diode 42 serves to inhibit reverse voltage from being applied to the capacitor assembly from junction point 24.

In operation, the linear varying voltage across the capacitor 35 is initially presented to the emitter electrode of the unijunction transistor 20. When the voltage across capacitor 35 exceeds the voltage of Zener diode 38 the capacitors 35 and 36 are effectively coupled together in parallel and provide a different linear slope wave form to said emitter electrode. Correspondingly, when the voltage across capacitor element 35 exceeds the voltage of Zener diode 39 the linear slope wave form again changes with the values of the individual components in said capacitor assembly being selected to provide three finite slope changes having an aggregate nonlinear response compensating for nonlinearity in response of the phase-control power amplifier. When the voltage across capacitor 35 exceeds the threshold voltage of the unijunction transistor 20 the triggering circuit will fire and apply a pulse through pulse transformer 23 to SCR 9. The triggering circuit is synchronized to an AC power source being supplied to the control motor by means of a phasing voltage input signal. The phasing voltage defines the beginning and end of the time period of desired conduction for SCR 9 and is applied across the triggering circuit to provide a switching means for the voltage across the capacitor assembly such that the unijunction transistor conducts only in the presence of said phasing voltage. The unijunction transistor 20 exhibits a relatively high impedance between its emitter electrode 19 and its base one electrode 21 whenever the emitter voltage is below a certain fraction of the voltage between the base one and base two electrodes. When the emitter voltage is raised to this predetermined threshold level, the unijunction transistor breaks down and displays a low impedance between its emitter and its base one electrode thereby allowing current to flow therebetween and to the primary winding of pulse transformer 23. Since the emitter voltage of the unijunction transistor 20 is essentially the voltage present at the junction point 24, this emitter voltage increases linearly with the charging voltage across the capacitor elements being charged. Thus it can be seen that the magnitude of the emitter voltage or triggering voltage of the unijunction transistor 20 is a function of time or phase angle of the phasing voltage present at terminal 25. On the other hand, the voltage between the base one and base two electrodes 21 and 22 of the unijunction transistor 20 is a function of the DC control voltage present at terminal 41. Thus, from the characteristic operation of a unijunction transistor, it can be seen that time of turn on for SCR 9, or the time at which the unijunction transistor 20 breaks down and allows the energy stored in the capacitor elements being charged or dumped through the primary of pulse transformer 23, is when the emitter voltage, which is a function of phase angle of the phasing voltage is equal to a predetermined constant fraction of the base-to-base voltage, which is a function of the DC control signal.

Referring now to FIG. 3, there is shown a different preferred embodiment for a unijunction transistor triggering circuit employing the principles of the present invention. Structural elements common to the circuitry in FIGS. 2 and 3 are identified with the same numerals for clarity of illustration. Accordingly, triggering circuit 43 comprises a unijunction transistor 20 having its base one electrode 21 connected to terminal 41 for application of a DC control signal and base two electrode 22 connected to the primary winding of pulse transformer 23. The secondary winding of said pulse transformer is adapted for connection to the gate-cathode circuit of SCR 9. The emitter electrode 19 of unijunction transistor 20 is coupled to a junction point 24 which junction point is also common to a source of phasing voltage and a source of constant current for the capacitor assembly of the triggering circuit. A source of phasing voltage is applied at terminal 25 for connection through diode 26 which is grounded and resistor 27 to a junction point 44 which is also common to resistor 45. Resistor 51 connects diode 26 and resistor 27 to ground and attenuates the phasing voltage. The halfwave rectified voltage signal at junction point 44 which is negative with respect to ground is then applied to a switching transistor 46 and the output signal therefrom supplied to junction point 24. The constant current source derived in transistor 34 as previously described for the FIG. 2 embodiment is also coupled to junction point 24. A back EMF signal obtained from the controlled motor 11 is applied at terminal 47 and coupled through resistor 48 and diode 49 to one side of capacitor 35. The attenuated back EMF signal appears across resistor 52. Diode 50 is connected between the same side of said capacitor element and the common connection for remaining capacitor elements in the capacitor assembly to allow only the back EMF voltage associated with one direction of motor rotation to modify the triggering circuit operation.

In operation, the triggering circuit 43 operates in the same general manner described for the FIG. 2 embodiment to provide triggering pulses to SCR 9 except for a modification provided by variation in the charging of the capacitor assembly as a function of the back EMF in the controlled motor. Specifically, the compensated firing circuit in the FIG. 2 embodiment provides a linear gain characteristic for the overall motor control system at zero speed of the controlled motor. The inductive nature of the motor armature creates a back EMF condition in the motor and the motor back EMF causes a system gain characteristic to shift from the zero speed characteristic in a manner depending on the direction of rotation for said motor. Such effect is attributable to the variation in motor back EMF with different speeds of the controlled motor which causes a new zero crossing of the controlled rectifier anode supply voltage. When the back EMF is high enough the compensation around the new zero is inadequate and produces a nonlinearity requiring compensation to maintain a linear response for the overall motor control system. The additional compensation can be provided by means of a positive feedback of the motor back EMF signal being applied as an input signal at terminal 47 of the triggering circuit. The applied back EMF signal establishes a voltage level for the voltage ramp pedestal from which the initial charging rate on capacitor 35 commences. Since capacitor 35 now charges from a higher voltage point, dependent on back EMF, the threshold points for slope changes when charging the remaining capacitors in the capacitor assembly will be reached earlier in time. Consequently, the voltage threshold of the unijunction transistor 20 will also be reached earlier, resulting in advance of the firing angle for SCR 9. A new artificial zero for the firing circuits is thereby formed to compensate for the new artificial zero crossing of the control rectifier sinusoid caused by the back EMF voltage.

Understandably, the present invention is not limited to the particular details of the preferred embodiments above illustrated since it will be evident that various modifications and applications within the scope of this invention will occur to those skilled in the art. For example, modifications in the capacitor assembly portion of the triggering circuit are contemplated wherein diode elements other than Zener diodes are serially connected between the paired capacitor elements and a supplemental voltage source is coupled across the paired capacitor elements. Additionally, it is contemplated to derive a motor back EMF signal for the triggering circuit not only by conventional means wherein a tachometer is coupled to the motor shaft but also by utilizing the output signal from an amplifier provided with a dual input of the motor current and the motor terminal voltage. It is therefore intended that the appended claims cover such modifications which do not depart from the scope and spirit of this invention.

I claim:

1. For use in a motor control system comprising drive motor means and power amplifier means including controlled rectifier means for applying electrical energy from an alternating current source to said motor means, unijunction transistor triggering circuit means which compensates for the nonlinear response of said power amplifier means, said unijunction transistor triggering circuit means including an assembly of parallel connected capacitor elements having serially connected voltage elements which permit said capacitor elements to operate in parallel when the threshold value of said voltage elements has been exceeded and said capacitor elements being connected to a constant current source to supply the voltage across said capacitor assembly to the emitter electrode of a unijunction transistor in said circuit and said unijunction transistor having a DC error voltage applied to one base electrode whereby energy stored in said capacitor assembly is discharged from a second base electrode of said unijunction transistor when the threshold value of said unijunction transistor is exceeded to supply a firing pulse to the controlled rectifier means.

2. Unijunction transistor triggering circuit means for use in a motor control system according to claim 1 which further includes a source of phasing voltage for synchronization of the unijunction transistor operation with the alternating current source.

3. Unijunction transistor triggering circuit means for use in a motor control system according to claim 2 which further includes means to vary the initial charging of the capacitor assembly as a function of the magnitude of the back EMF in the drive motor.

4. Unijunction transistor triggering circuit means for use in a motor control system according to claim 1 wherein said constant current source comprises a transistor having a fixed bias voltage applied thereto so as to maintain the current output of said transistor at a constant level.

5. Unijunction transistor triggering circuit means for use in a motor control system according to claim 4 wherein said assembly of parallel connected capacitor elements consists of paired capacitor elements having Zener diode elements serially connected to the capacitor elements.

6. Unijunction transistor triggering circuit means for use in a motor control system according to claim 4 wherein said capacitor assembly consists of paired capacitor elements being connected in parallel to a source of constant current and having diodes serially connected to said capacitor elements for electrical isolation of a voltage source coupled across the paired capacitor elements.